United States Patent [19]

Everhard

[11] Patent Number: 5,072,811

[45] Date of Patent: Dec. 17, 1991

[54] TELESCOPIC BRAKE PISTON

[75] Inventor: Kenneth D. Everhard, Wadsworth, Ohio

[73] Assignee: Aircraft Braking Systems Corporation, Akron, Ohio

[21] Appl. No.: 457,903

[22] Filed: Dec. 27, 1989

[51] Int. Cl.5 .............................................. F16D 55/18
[52] U.S. Cl. .................................. 188/72.4; 188/370; 92/51; 92/52; 92/61; 92/65; 92/151
[58] Field of Search .................. 92/51, 52, 53, 61, 65, 92/75, 107, 108, 146, 151, 150; 188/72.4, 72.5, 71.8, 151 R, 368, 370

[56] References Cited

U.S. PATENT DOCUMENTS

| | | | |
|---|---|---|---|
| 2,952,338 | 9/1960 | Oswalt | 188/72.4 |
| 3,255,846 | 6/1966 | Livezey | 188/71 B |
| 3,302,535 | 2/1967 | Procter et al. | 92/52 |
| 3,707,210 | 12/1972 | Nyunoya et al. | 92/108 |
| 3,828,894 | 8/1974 | Crossman | 188/72.4 |
| 3,995,721 | 12/1976 | Chambers | 92/51 |
| 4,006,669 | 2/1977 | Price | 188/72.4 |
| 4,570,531 | 2/1986 | Anderson et al. | 188/72.4 |

FOREIGN PATENT DOCUMENTS

| | | | |
|---|---|---|---|
| 958718 | 2/1957 | Fed. Rep. of Germany | 92/51 |
| 1263067 | 7/1959 | France | 92/51 |
| 2003231 | 3/1979 | United Kingdom | 188/72.4 |

*Primary Examiner*—Edward K. Look
*Assistant Examiner*—Thomas Denion
*Attorney, Agent, or Firm*—Renner, Kenner, Greive, Bobak, Taylor & Weber

[57] ABSTRACT

A telescopic brake piston includes a cylindrical housing and a pair of concentric pistons. A first hydraulic cavity is provided between an outer piston and the housing, while a second hydraulic cavity, communicating with a source requesting the application of brake force, communicates with both pistons. Passages in the outer piston allow the two cavities to communicate with each other. As the associated brake disc stack wears, the outer piston progressively extends from the housing as the passages are exposed by the inner piston. The actual brake force is attained by the inner piston alone.

6 Claims, 1 Drawing Sheet

TELESCOPIC BRAKE PISTON

TECHNICAL FIELD

The invention herein resides in the art of aircraft braking systems and, more particularly, to such systems employing a brake disc stack to achieve the braking operation. Specifically, the invention relates to a telescopic piston actuator capable of operation at a constant input/output force ratio throughout the usable life of the brake disc stack while being maintained in a compact housing.

BACKGROUND ART

The use of brake disc stacks in aircraft braking systems is well known. Interleaved discs alternately splined to the wheel and axle of the aircraft are forced together to achieve the frictional braking action. Typically, brake pistons are provided within the brake housing and caused to act against a pressure plate which is in turn urged against the stack. It is well known that as the discs wear the required stroke of the pistons increases. Unless the pistons are of a telescopic nature, the length of the piston assembly must be at least equal to the maximum travel distance of the piston during the life of the brake disc stack. Telescopic pistons allow greater piston travel in a compact housing, while maximizing the wear obtained from the discs of the stack.

While telescopic brake piston assemblies have previously been known, the piston output force for a given input force has been found to vary as a function of the piston extension. In those brake piston assemblies in which concentric pistons are sequentially actuated, it has been found that the relationship between input pressure and output force with respect to the brake piston is a function of the stage being actuated at that point in the life of the brake disc stack. Accordingly, the braking action resulting from a pilot's braking effort will change during the useful life of the brake disc stack. Of course, such is most undesirable.

There is accordingly a need in the art for a telescopic brake piston which demonstrates a constant and consistent relationship between the input pressure and the output force, while allowing maximum extension of the telescopic piston to maximize brake wear, while maintaining the same in a housing of minimal size.

DISCLOSURE OF INVENTION

In light of the forgoing, it is a first aspect of the invention to provide a telescopic brake piston exhibiting constant input-output force relationships throughout the full extension of the piston.

Another aspect of the invention is the provision of a telescopic brake piston which is readily conducive to implementation with presently existing braking systems.

Still a further aspect of the invention is the provision of a telescopic brake piston which is easy to construct, reliable and durable in operation, and cost effective in both manufacture and implementation.

The forgoing and other aspects of the invention which will become apparent as the detailed description proceeds are achieved by a telescopic brake piston, comprising: a tubular housing; a first piston received and movable within said housing; a second piston received and movable within said first piston; and a first pressure cavity within said housing receiving respective heads of said first and second pistons.

Other aspects of the invention which will become apparent herein are attained by a telescopic brake piston assembly, comprising: a cylindrical housing; a first piston having an annular head and a cylindrical body extending therefrom, said annular head being slidingly received within said housing, defining a first cavity between said housing and said cylindrical body; a second piston slidingly received within said first piston and in contacting engagement with a pressure plate of a brake disc stack; a second cavity within said housing and bounded by said first and second piston; and a passageway through said cylindrical body of said first piston selectively interconnecting and disconnecting said first and second cavities as a function of a position of said second piston within said first piston.

DESCRIPTION OF DRAWING

For a complete understanding of the objects, techniques, and structure of the invention reference should be made to the following detailed description and accompanying drawing wherein.

BEST MODE FOR CARRYING OUT THE INVENTION

Figure 1:
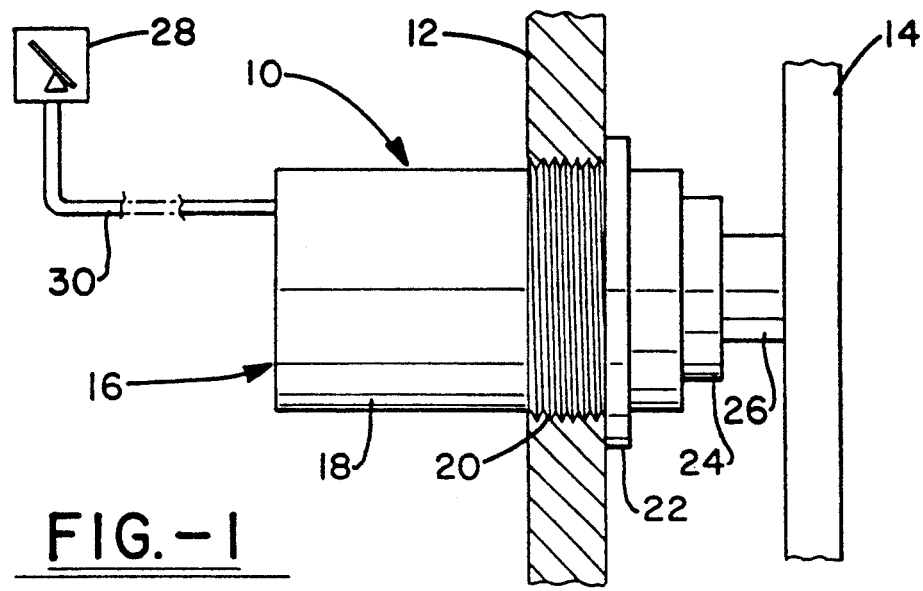
FIG. 1 is an illustrative view, in partial cross section, showing the telescopic brake piston of the invention interposed between a brake housing and a pressure plate.

Referring now to the drawing and more particularly FIG. 1, it can be seen that a brake system according to the invention is designated generally by the numeral 10. This brake system, typical of those employed on aircraft, would typically comprise a brake housing 12 fixedly secured to the axle or other stationary portion of the aircraft and in juxtaposition to a brake disc stack. A pressure plate 14 would typically be interposed between the telescopic brake piston assembly 16 and the discs of the brake disc stack. As is well known to those skilled in the art, the telescopic brake piston assembly 16 is adapted to urge the pressure plate 14 against the brake disc stack, causing the interleaved rotor and stator discs to frictionally engage, thus achieving the braking action. It will further be understood by those skilled in the art that a plurality of telescopic brake piston assemblies 16 would typically be received by the brake housing 12 and be uniformly positioned about a central axis thereof.

The housing 18 of each of the telescopic brake piston assemblies 16 would typically be threaded as at 20 to the brake housing 12 until the shoulder 22 of the housing 18 abuts the housing 12, indicating that the brake piston assembly 16 is properly positioned and seated. Maintained within and adapted to extend from the housing 18 is an outer piston 24 and an inner piston 26. It will be appreciated that the pistons 24, 26 are concentric with each other and with the interior of the housing 18, and are adapted for axial movement with respect to each other and with respect to the housing 18.

A hydraulic pressure source 28, typically metered by a brake pedal or other metering means, is adapted to pass hydraulic fluid under pressure through the hydraulic line or conduit 30 to the inner working cavity of the housing 18 for actuation of the pistons 24, 26. It will, of course, be appreciated that the metering of such hydraulic pressure may be achieved manually, by an automatic braking system, or by any other appropriate means.

Figure 2:
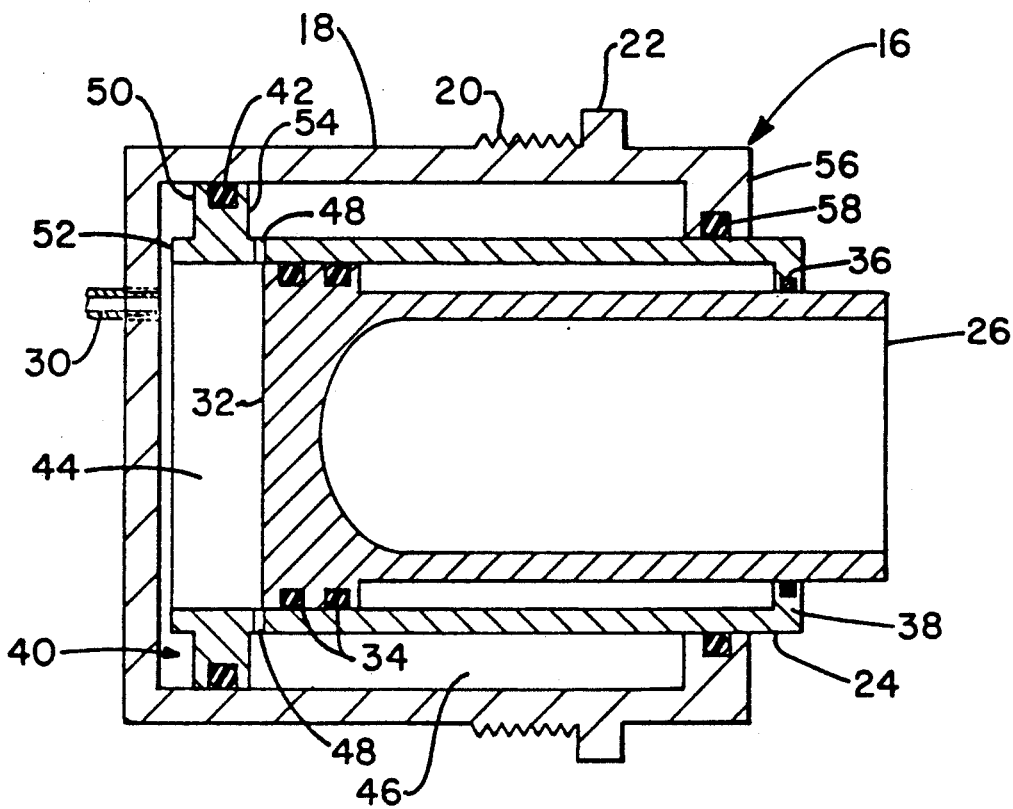
FIG. 2 is a cross sectional view of the telescopic brake piston of the invention.

With reference now to FIG. 2, it can be seen that the piston 26 is typically characterized by a disc-shaped piston head 32 at the ends thereof opposite the end adapted for contacting the pressure plate 14. The piston head 32 is received within the cylindrical bore of the piston 24 and is sealed against the interior sidewall thereof by means of a pair of O-ring seals 34. In standard fashion, the seals 34 are maintained within appropriate circumferential grooves passing about the piston head 32. A scraper ring 36 is received within a circumferential groove maintained within the inner extending shoulder 38 of the piston 24. The scraper ring 36 acts against the outer surface of the piston 26. The contact of the head 32 with the inner wall of the piston 24, and the contact of the shoulder 38 with the outer surface of the piston 26 guarantees that the piston 24, 26 will maintain a concentric coaxial alignment.

The outer piston 24 is provided with a piston head 40 comprising an annular ring having an outer diameter equivalent to the inner diameter of the housing 18, and an inner diameter equivalent to the diameter of the piston head 32. An O-ring seal 42, maintained within a circumferential groove in the head 40, provides a seal against the inner cylindrical wall of the housing 18.

A novel feature of the instant invention is the inclusion of two operative cavities for achieving the desired constant force telescopic operation. The first cavity 44 is common to both piston heads 32, 40 and communicates through the hydraulic line 30 to the hydraulic pressure source 28. Accordingly, the brake pressure requested by the pilot is applied to the cavity 44 and the hydraulic pressure within the cavity 44 is translated to a force upon the respective piston in accordance with the surface area of the respective piston heads normal to the piston axis. The second hydraulic cavity of the telescopic brake system assembly 16 is the cavity 46 interposed between the outer wall of the outer piston 24 and the inner wall of the housing 18 as appropriately seal at 42, 58. In operation, the cavity 46 would be filled with hydraulic fluid. A plurality of bores or passages 48 pass through the wall of the piston 24 at points immediately adjacent the surface 54 of the head 40, such surface forming a top boundary of the cavity 46. While the number of passages 48 may vary, at least one such passage is required to achieve the objects of the invention.

It will be appreciated that the piston head 40 comprises an outer annular flange 50 and an inner annular ridge 52. In a preferred embodiment, the surface area of the outer flange 50 is equivalent to the surface area of the surface 54 on the opposite side of the head 40. Accordingly, the surface area 50, 52 of the head 40 in communication with the cavity 44 exceeds the surface area 54 of the head 40 in communication with the cavity 46 by an amount equivalent to the surface area of the annular inner ridge 52. Hence, when the piston 26 is received by the piston 24 in such a manner as to expose the passage 48, the hydraulic pressure in the cavity 44 will exert a resultant force on the piston 24 equivalent to the hydraulic pressure multiplied by the surface area of the annular ridge 52, this force urging the piston 24 from the opening of the housing 18 defined by the shoulder or flange 56 having the seal 58 retained therein and in contacting engagement with the outer surface of the piston 24. When the piston 26 is received within the cylindrical bore of the piston 24 such that the head 32 seals the passages 48, the incompressible hydraulic fluid within the cavity 46 will prevent any movement of the piston 24, allowing only the piston 26 to move within the bore of the piston 24.

In light of the forgoing, it should be appreciated that the braking force urged against the pressure plate 14 will always be the result of the pressure within the cavity 44 urging solely against the surface area of the piston head 32. As the brake disc stack wears, and the piston 26 is extended to expose the passages 48, the force resulting from the hydraulic fluid acting upon the surface of the ridge 52 will cause the piston 24 to extend from the housing 18 until the passages 48 are sealed by the head 32. Such extension will continue until the surface 54 of the head 40 abuts the inner surface of the shoulder 56 of the housing 18, limiting any further movement of the piston 24. The piston 26 will, in like manner, be operable until the head 32 abuts the shoulder 38 of the piston 24. Of course, the abutment of the head 40 with the shoulder 56 will occur prior to the abutment of the head 32 with the shoulder 38. It will be appreciated that, following the concepts of the invention presented above, the braking force is always determined from the action of the pressure source against a surface of fixed area. The extension of the outer piston 24 will be independent of braking force and the full extension of the outer piston will be completed before any significant extension of the inner piston 26 from the outer piston 24 is experienced.

Using the concept shown in the drawing and described above, one can obtain a telescopic brake piston providing the benefits of a compact housing and extendable use, while assuring that the brake effort will be consistent, predictable, and repeatable.

Thus is can be seen that the objects of the invention have been satisfied by the structure presented above. While in accordance with the patent statues only the best mode and preferred embodiment of the invention has been presented and described in detail, it is to be understood that the invention is not limited thereto or thereby. Accordingly, for an appreciation of the true scope and breadth of the invention reference should be made to the following claims.

What is claimed is:

1. A telescopic brake piston assembly, comprising:
   a cylindrical housing;
   a first piston having an annular head and a cylindrical body extending therefrom said annular head being slidingly received within said housing, defining a first cavity between said housing and said cylindrical body;
   a second piston slidingly received within said first piston and in contacting engagement with a pressure plate of a brake disc stack;
   a second cavity within said housing and bounded by said first and second piston;
   a passageway through said cylindrical body of said first piston selectively interconnecting and disconnecting said first and second cavities as a function of a position of said second piston with said first piston, providing an only restriction to movement of said first piston within said housing between first and second ends of said housing; and
   a hydraulic conduit passing through said housing to said first cavity, providing an only conduit for hydraulic fluid between the telescopic brake piston and a source of hydraulic pressure.

2. The telescopic brake piston assembly as recited in claim 1, wherein a first surface area of said annular head exposed to said first cavity is less than a second surface area of said annular head, parallel to said first surface area, exposed to said second cavity.

3. The telescopic brake piston as recited in claim 2, wherein said first and second cavities are filled with hydraulic fluid, and said second cavity communicates with said source of hydraulic pressure.

4. The telescopic brake piston assembly as recited in claim 3, wherein said first cavity diminishes in size as said second cavity increases in size.

5. The telescopic brake piston assembly as recited in claim 3, wherein said first cavity is sealed when said first and second cavities are disconnected.

6. The telescopic brake piston assembly as recited in claim 3, wherein a third cavity is defined between said first and second pistons, said third cavity being devoid of hydraulic fluid.

* * * * *